Patented Sept. 15, 1953

2,652,340

UNITED STATES PATENT OFFICE 2,652,340

STABILIZED CELLULOSE LOWER ALKANOATES

Gordon D. Hiatt and Robert F. Williams, Rochester, N. Y., assignors to Eastman Kodak Company, Rochester, N. Y., a corporation of New Jersey No Drawing. Application June 4, 1949,
Serial No. 97,325

8 Claims. (Cl. 106—181)

This invention relates to stabilized cellulose esters having low ash and sulfur contents which have been stabilized by the addition thereto of an alkali metal acid salt of oxalic, tartaric or malic acid.

Cellulose esters as prepared in the conventional manner from woodpulp or cotton linters tend to discolor at high temperatures and undergo chain cleavage. This is a decided disadvantage in the use of such esters in processes involving elevated temperatures, such as in molding, fabrics, etc., and, consequently, methods have been developed for stabilizing those esters against the effects of elevated temperatures. One method for retarding discoloration has been the addition of weak acids, but the gain in color stability obtained by this addition has usually been offset by a loss in the chain length stability of the cellulose ester. In some cases salts have been added to the cellulose esters but in those cases the color stability and clarity have often been sacrificed even though chain length stability has been achieved.

One object of our invention is stabilized cellulose esters which retain color and chain length stability at elevated temperatures and which, also, are of excellent clarity. Another object of our invention is to provide a method of stabilizing cellulose esters utilizing salts of oxalic, tartaric, and malic acids. Other objects of our invention will appear herein.

Ordinarily the haze in cellulose esters is the result of the presence of minerals in the material. In order to stabilize such esters by the addition of more mineral material, the combination of clarity, good color stability and good chain length stability is difficult to achieve. We have found, however, that all three properties may be obtained in the same cellulose ester if the ester is prepared under such conditions that the hydrolysis thereof is performed in the presence of only a small proportion of sulfate ion and the ester is washed with water of low mineral content, followed by treatment thereof with acid salt as described above in a proportion related to the sulfur content which is present.

In its broadest aspects our invention involves the esterification of cellulose with a lower fatty acid anhydride, such as acetic anhydride or butyric anhydride in the presence of sulfuric acid catalyst, neutralization at the end of the esterification of .25 to .9 of the esterification catalyst with a neutralizing agent which forms a salt which is insoluble in the reaction mixture and adding water or aqueous acid to cause hydrolysis of the cellulose ester at a temperature of 110–180° F. and at a rate that the water is stirred into the mass as it is added. If the stirring is vigorous, the rate of addition may be fairly rapid. After the ester has been hydrolyzed for a time, in the case of cellulose acetate for a time sufficient to give acetone solubility, the ester is filtered to remove a major portion of the sulfate salt formed by catalyst neutralization with MgO, $Mg(C_2H_3O_2)_2$ or the like, and then precipitated from solution with aqueous acetic acid, such as of 5–20% concentration and washed at least once with water having a mineral content less than 20 p. p. m. Either in the last wash or after the last wash and prior to drying or to the dried ester during compounding with the plasticizer, a water-soluble acid salt of oxalic, malic, or tartaric acid is supplied to the ester in the proportion of 1–3 molecular equivalents of the salt per equivalent of sulfate ion based on the sulfur content of the ester.

Our invention applies to cellulose esters of fatty acids of 2–4 carbon atoms, either simple or mixed. Some of the esters which may be prepared in accordance with our invention are cellulose acetate, cellulose acetate butyrate, cellulose acetate propionate, cellulose butyrate, and cellulose propionate. In the case of cellulose acetates the esterifying liquid is made up primarily of acetic anhydride, acetic acid, and sulfuric acid catalyst. In the case of celluose acetate butyrate the esterifying liquid may be made up either of butyric anhydride, acetic acid and sulfuric acid catalyst or of acetic anhydride, butyric acid, and catalyst depending on whether a high or low butyryl ester is desired. The proportion of catalyst employed in the esterification may be from 1.5 to 10% of sulfuric acid based on the dry weight of the cellulose. Ordinarily, to obtain esters of good viscosity the esterification temperature is not allowed to rise above 100° F. although the esterification temperatures employed depend somewhat upon the amount of sulfuric acid catalyst used, the more catalyst present in the esterification mass, the more important it becomes that the temperature of the reaction mass be carefully controlled. In order to terminate the esterification, water, usually in the form of aqueous acid, is added to the reaction mass in a sufficient proportion to convert the acetic anhydride remaining to acetic acid. In this addition, or in the water in the form of aqueous acid which is added to initiate the hydrolysis, or as a separate addition at this time, a neutralizing agent is applied to the ester which will form a salt of a considerable proportion of the sulfuric acid, which salt is insoluble in the reaction mixture. Magnesia or magnesium compounds of weak acids have been found to be especially useful for this purpose as the magnesium sulfate formed is insoluble in the reaction mass. Instead, a calcium neutralizing agent can be employed in this connection, if desired. By neutralizing the greater portion, but not all, of the catalyst which is present, the hydrolysis may be carried out but the combined sulfuric acid in the final ester is held to a sulfur content in the final product of .001 to .015%. In carrying out the hydrolysis of the cellulose ester the water in the form of aqueous acid which is added to the mass should be added at such a rate that it is uniformly worked into the hydrolysis mixture. Also, the addition and the hydrolysis should be at a temperature within the range of 110–180° F. After the ester has been hydrolyzed to the desired extent which is ordinarily to impart .05–5 hydroxyls per $C_6$ cellulose units, the ester is precipitated by the addition of aqueous acid to recover the ester in a powdered form. The ester is then given a thorough washing in water, preferably several washes with water having a low mineral content such as less than 20 p. p. m. mineral content. Such water may be either distilled water or water which has been prepared using Permutite or other means which removes ions from the water available for washing purposes. The use of water having a mineral content of about 10 p. p. m. has been found to be quite satisfactory and with three or four washings with this type of water the ash content of cellulose esters has geen reduced to .015–047%. The ester should be washed sufficiently that the ash content thereof does not exceed .05%.

In the last wash, or as a separate addition after the last wash and before drying or as an addition to the compounding mixer, an acid salt of oxalic, malic, or tartaric acid is added in the form of its aqueous solution. This salt may be added in solution in distilled water or any other water of a low mineral content. Salts which are suitable in this connection may be either potassium acid oxalate, potassium acid maleate, or potassium acid tartrate, or the solutions may be made by mixing, for instance, oxalic acid and potassium or sodium oxalate which forms the acid salt. Exact equivalency is not necessary, but it is desirable at a high stabilizing salt level that the equivalency be close, not varying more than 5%. Where only a small amount of stabilizing salt is necessary, one reagent may exceed the other by as much as 10–15% without seriously interferring with the clarity or the chain length stability of the resulting product. As a general rule, it may be stated that the ratio of the potassium oxalate to oxalic acid should be within the range of 2.25–1.75:1.75–2.25. The makeup of the acid salt may be governed to some extent by the character of the ester being treated. If the ester has alkaline salts contributed by the wash water, it may be desirable to tend slightly to the acid side. On the other hand, if the ester has a low salt content and contains a little unneutralized sulfuric acid, a slight excess of the neutral salt may be useful. For the usual ester batch straight acid salt may be used but stabilization may also be effected when this salt is toward the acid or toward the alkaline side by as much as 15%.

As an illustration of the effectiveness of our invention a hydrolyzed cellulose acetate butyrate ester of a sulfur and ash content within the ranges specified herein was divided into five parts and those parts were treated with the acid and the neutral salt in varying proportions. The following table shows those proportions ranging from 0 acid to 0 salt. The samples were then heated for one hour at 205° C., and tested for color, and for two hours at 205° C. and tested for intrinsic viscosity. The proportions and the intrinsic viscosities are as follows:

|  | Stabilizer | Concentration | Color, 1 Hr. | Intrinsic Viscosity |
|---|---|---|---|---|
| Control | | | Amber | .92 |
| A | $H_2C_2O_4$ | 0.00 | do | 1.32 |
| | $K_2C_2O_4$ | .05 | | |
| B | $H_2C_2O_4$ | .0125 | 350 | 1.20 |
| | $K_2C_2O_4$ | .0375 | | |
| C | $H_2C_2O_4$ | .025 | 165 | 0.92 |
| | $K_2C_2O_4$ | .025 | | |
| D | $H_2C_2O_4$ | .0125 | 400 | 0.16 |
| | $K_2C_2O_4$ | .0375 | | |
| E | $K_2C_2O_4$ | 0.00 | Black | 0.08 |
| | $H_2C_2O_4$ | .05 | | |

These results show that only the stabilizer in C gives a product satisfactory both as to color and intrinsic viscosity (cellulose chain length).

It is necessary that the acid oxalate (or other equivalent) salt remain in the cellulose ester in order for it to be effective. For instance, a 300 g. sample of cellulose acetate butyrate of low ash and sulfur content, in powdered form, was heated at 85° C. for two hours in 3000 cc. of distilled water containing 4.25 g. of potassium acid oxalate. This amount of the acid salt is equivalent to 1% of oxalic acid based on the cellulose ester. The slurry was allowed to cool and was then drained. The mass was divided into equal portions, one half (A) being thoroughly washed in distilled water and the other half (B) being washed in tap water. Both samples were compounded with 5% of added butyl sebacate to assist their plasticity. A sample of the same ester (C) was treated by the stabilizing method described herein and was compounded as described. The three plastic compositions were heated in test tubes for one and for two hours at 205° C. and were tested for haze, color and viscosity. The results were as follows:

|  | Haze | Color, 1 hr at 205° C. | Intrinsic Viscosity in Acetic Acid, 2 hrs. at 205° C. |
|---|---|---|---|
| A | − | dark brown | 0.12 |
| B | + | light brown | 0.66 |
| C | − | light yellow | 1.26 |

Samples A and B were unstable for both color and intrinsic viscosity. This run also shows the effect upon haze when the ash content of the ester is high as resulted from washing in tap water (B).

The color as specified in the above tables was determined by comparing for color with a stock solution made up as follows:

.20 g. Ciba oil soluble Yellow BB
.20 g. Calcofast Spirit Orange R
.002 g. General Dyestuffs Alizarine Cyanine Green G Ex. Conc. Color Index 1078
Made up to one liter with dimethyl phthalate The dark brown solution thus obtained is further diluted with dimethyl phthalate so that a 1:20 solution is regarded as having a color of 500, 1:50 solution as having a color of 180, and a 1:70 solution as having a color of 150.

The haze is determined by comparison with a standard in which 1 g. of kaolin, washed powder, American Standard, is carefully ground with a small amount of dimethyl phthalate. The paste thus obtained is then dispersed in dimethyl phthalate to make up one liter of dimethyl phthalate haze standard. Dilutions in dimethyl phthalate of 1:1, 1:10 and 1:50 are in a range of haze which is acceptable in molded plastics. A haze above these dilutions is regarded as positive haze.

The intrinsic viscosity in indicative of the degree of general breakdown. A cellulose ester composition which has been degraded much below a value of 1.0 (such as .5–.7 and lower) is not useful for plastic purposes. The intrinsic viscosity is determined by measuring the flow rate of a solution of 0.25 g. of the test composition made up to 100 cc. with glacial acetic acid. A measure of the flow time itself gives the relative viscosity.

$$\text{Relative viscosity } (n) = \frac{\text{flow time for solution}}{\text{flow time for solvent}}$$

$$\text{Intrinsic viscosity}(n) = 9.21 \log(n)_r$$

The preparation of cellulose esters having low sulfur content is described in an article by Malm, Tanghe, and Laird in Industrial and Engineering Chemistry, vol. 38, page 77, January 1946. The preparations described in that article were carried out on a laboratory scale and on a larger scale the water may be added during the hydrolysis at a more rapid rate providing the stirring uniformly distributes the water through the esterification mass and, yet, the combined sulfur in the cellulose ester is kept at a minimum.

The following examples illustrate our invention:

*Example 1.*—One part of refined cotton linters having a moisture content of 5% was mixed with 2.4 parts of acetic acid in an esterification mixer and the mixer was run for an hour at 100° F. A mixture of four parts of acetic acid and 0.88% sulfuric acid based on the weight of the cellulose was then added, and the mixing was continued at the same temperature for forty-five minutes whereupon the mass was cooled to 65° F. The cooling was limited at this stage by the crystallization of acetic acid but was continued to 60° F. after the addition of 2.7 parts of 98% acetic anhydride. A mixture of 6.12% of sulfuric acid based on the weight of the cellulose and some acetic acid was then added, and the jacket temperature of the mixer was controlled to permit a gradual rise in temperature to 90–95° F. during an interval of 1.5–2 hours. At this stage the reaction dope was very viscous and free from fibers. A mixture of one part of water, two parts of acetic acid and sufficient magnesium carbonate to neutralize 75% of the sulfuric acid catalyst was added over a period of one hour. After the magnesium carbonate had been thoroughly mixed into the mass, the temperature was raised to 140° F. and held at this temperature until tests indicated the ester had been hydrolyzed to an acetyl value of 38–39% acetyl. The mass was then filtered to remove unreacted fibers and the magnesium sulfate which had formed. The filtered mass was well stirred while 20% aqueous acetic acid was slowly added until the mass became turbid and finally passed the "break point" to form a fine granular precipitate of the cellulose ester. The ester was drained free of precipitation liquor and washed in several changes of water having a 20 p. p. m. mineral content to an essentially acid-free state. The dried product analyzed .008% sulfur and .015% ash.

The dried cellulose acetate was then treated in a compounding mixer with 0.02% of potassium acid oxalate added in the form of a 1% aqueous solution. After thorough mixing diethyl phthalate was added in the proportion of thirty parts of diethyl phthalate per 100 parts of cellulose acetate. The powder was worked on heated compounding rolls to insure complete fluxing of the ingredients. The plastic material after rolling had an intrinsic viscosity of 1.25 and after heating for two hours at 205° C., an intrinsic viscosity of 1.17. After subjecting to a color test by heating for one hour at 205° C. and then inspecting by the test described herein, the material was found to have a color of 200.

*Example 2.*—Cellulose acetate butyrate was prepared by first mixing three parts of cotton linters with 2.5 parts of glacial acetic acid and 0.5% of sulfuric acid based on the cellulose for one-half hour. The mixture was then cooled and was mixed with twelve parts of cold butyric anhydride. The proportion of sulfuric acid present was increased to 1.5% based on the weight of the cellulose. The temperature of the mass was controlled so that it gradually arrived at a temperature of 100° F. over a period of 6–8 hours. The viscous mass thus formed was slowly diluted with 40% aqueous acetic acid containing enough magnesium carbonate to neutralize 50% of the sulfuric acid used. The well mixed mass was held at 150° F. until testing indicated hydrolysis to the extent of 0.25 hydroxyl groups per $C_6$ unit of cellulose. The mass was then filtered to remove fibers and magnesium sulfate and was then precipitated as a fine powder by slowly adding with agitation 20–40% aqueous acetic acid thereto. The powder formed was thoroughly washed in distilled water to an essentially acid-free state whereupon the powder was vacuum dried. To 100 parts of the powder was added .025 part of potassium acid malate which was 15% toward the alkaline side (one mol. of malic acid was used for each 1.15 mols. of dipotassium malate). The potassium acid malate was added as a 1% aqueous solution. After completely mixing the malate with the cellulose ester powder, there was then further mixed therewith five parts of dibutyl sebacate. The mixture was then worked by compounding on steam heated compounding rolls at 170° C. The finished plastic was then tested for color and viscosity stability by heating at 205° C. with the following results where no potassium acid malate was used and where that material was added as described:

|  | 2 hrs. at 205° C., Int. Visc. | 1 hr. at 205° C., Color |
|---|---|---|
| No stabilizer added | 0.2 | black. |
| With stabilizer | 1.32 | 165. |

Before use the plastic material may be mixed with coloring or pigmenting agents to give the desired appearance and ultraviolet inhibitors, such as phenyl salicylate, may also be added, if desired.

We claim:
1. A lower fatty acid ester of cellulose containing .05–.5 hydroxyls per $C_6$ unit of cellulose, which ester has a sulfur content of .001–.015% and an ash content of not more than .05% in which has been incorporated an alkali metal acid salt of an acid selected from a group consisting of oxalic, malic and tartaric in the amount of 1-3 molecular equivalents of the salt per equivalent of sulfate ion in the ester whereby the cellulose ester is stabilized against the effects of elevated temperatures.

2. A cellulose acetate butyrate containing .05-.5 hydroxyls per $C_6$ unit of cellulose, which ester has a sulfur content of .001-.015% and an ash content of not more than .05% in which has been incorporated an alkali metal acid salt of an acid selected from a group consisting of oxalic, malic and tartaric in the amount of 1-3 molecular equivalents of the salt per equivalent of sulfate ion in the ester whereby the ester is stabilized against the effects of elevated temperatures.

3. A cellulose acetate containing .05-.5 hydroxyls per $C_6$ unit of cellulose, which ester has a sulfur content of .001-.015% and an ash content of not more than .05% in which has been incorporated an alkali metal acid salt of an acid selected from a group consisting of oxalic, malic and tartaric in the amount of 1-3 molecular equivalents of the salt per equivalent of sulfate ion in the ester whereby the ester is stabilized against the effects of elevated temperatures.

4. A lower fatty acid ester of cellulose containing .05-.5 hydroxyls per $C_6$ unit of cellulose, which ester has a sulfur content of .001%-.015% and an ash content of not more than .05% in which has been incorporated an alkali metal acid oxalate in the amount of 1-3 molecular equivalents of the salt per equivalent of the sulfate ion in the ester whereby the ester is stabilized against the effects of elevated temperatures.

5. A lower fatty acid ester of cellulose containing .05-.5 hydroxyls per $C_6$ unit of cellulose, which ester has a sulfur content of .001%-.015% and an ash content of not more than .05% in which has been incorporated a potassium acid oxalate in the amount of 1-3 molecular equivalents of the salt per equivalent of the sulfate ion in the ester whereby the ester is stabilized against the effects of elevated temperatures.

6. A lower fatty acid ester of cellulose containing .05-.5 hydroxyls per $C_6$ unit of cellulose, which ester has a sulfur content of .001%-.015% and an ash content of not more than .05% in which has been incorporated an alkali metal acid tartrate in the amount of 1-3 molecular equivalents of the salt per equivalent of the sulfate ion in the ester whereby the ester is stabilized against the effects of elevated temperatures.

7. A lower fatty acid ester of cellulose containing .05-.5 hydroxyls per $C_6$ unit of cellulose, which ester has a sulfur content of .001%-.015% and an ash content of not more than .05% in which has been incorporated an alkali metal acid malate in the amount of 1-3 molceular equivalents of the salt per equivalent of the sulfate ion in the ester whereby the ester is stabilized against the effects of elevated temperatures.

8. A thermoplastic composition which forms plastic products of good clarity and color stability at elevated temperatures, essentially consisting of a lower fatty acid ester of cellulose containing .05-.5 hydroxyls per $C_6$ unit cellulose unit, a sulfur content of .001-.015% and an ash content of not more than .05% in which ester has been incorporated an alkali metal acid salt of an acid selected from oxalic, malic and tartaric in the amount of 1-3 molecular equivalents of the salt per equivalent of sulfate ion in the ester and a plasticizer for the cellulose ester.

GORDON D. HIATT.
ROBERT F. WILLIAMS.

References Cited in the file of this patent

UNITED STATES PATENTS

| Number | Name | Date |
|---|---|---|
| 1,607,474 | Mork | Nov. 16, 1926 |
| 1,921,949 | Sheppard | Aug. 8, 1933 |
| 2,091,972 | Dreyfus | Sept. 7, 1937 |
| 2,154,822 | Quisling | Apr. 18, 1939 |
| 2,265,218 | Stone | Dec. 9, 1941 |
| 2,361,500 | Rowley | Oct. 31, 1944 |